(12) United States Patent
Funk

(10) Patent No.: US 7,790,210 B2
(45) Date of Patent: Sep. 7, 2010

(54) FOOD PRODUCT AND METHOD OF PREPARATION

(75) Inventor: Dean F. Funk, Brooklyn Park, MN (US)

(73) Assignee: General Mills, Inc., Minneapolis, MN (US)

( * ) Notice: Subject to any disclaimer, the term of this patent is extended or adjusted under 35 U.S.C. 154(b) by 445 days.

(21) Appl. No.: 11/882,629

(22) Filed: Aug. 3, 2007

(65) Prior Publication Data

US 2008/0038419 A1 Feb. 14, 2008

Related U.S. Application Data

(62) Division of application No. 10/209,707, filed on Aug. 1, 2002, now Pat. No. 7,264,835.

(51) Int. Cl.
*A23L 1/48* (2006.01)

(52) U.S. Cl. .......................... 426/89; 426/94; 426/102; 426/104; 426/629; 426/660

(58) Field of Classification Search .................. 426/89, 426/94, 102, 104, 629, 660
See application file for complete search history.

(56) References Cited

U.S. PATENT DOCUMENTS

| | | | |
|---|---|---|---|
| 2,272,990 A | 2/1942 | Forkner et al. | |
| 2,650,880 A | 9/1953 | Erickson | |
| 3,586,512 A | 6/1971 | Mancuso et al. | |
| 3,922,370 A * | 11/1975 | Prakash | 426/559 |
| 4,335,155 A | 6/1982 | Blake et al. | |
| 4,681,770 A | 7/1987 | Palmer | |
| 4,853,236 A | 8/1989 | Langler | |
| 4,888,187 A | 12/1989 | Given, Jr. et al. | |
| 4,889,730 A | 12/1989 | Roberts et al. | |
| 5,093,146 A * | 3/1992 | Calandro et al. | 426/619 |
| 5,200,222 A | 4/1993 | Schwab et al. | |
| 5,208,059 A | 5/1993 | Dubowik et al. | |
| 5,455,053 A | 10/1995 | Zimmermann et al. | |
| 5,554,406 A | 9/1996 | Muenz et al. | |
| 5,558,890 A * | 9/1996 | Brown et al. | 426/94 |
| 5,718,931 A | 2/1998 | Walter et al. | |
| 5,942,268 A | 8/1999 | Zimmermann et al. | |
| 6,110,511 A | 8/2000 | Rollins et al. | |
| 6,210,720 B1 | 4/2001 | Leusner et al. | |
| 6,479,085 B1 | 11/2002 | Archibald | |
| 6,676,982 B2 | 1/2004 | Mody | |
| 2002/0051837 A1 | 5/2002 | Beharry | |
| 2002/0192345 A1 | 12/2002 | Kepplinger et al. | |

* cited by examiner

*Primary Examiner*—Lien Tran
(74) *Attorney, Agent, or Firm*—John A. O'Toole; Everett G. Diederiks

(57) ABSTRACT

Composite food products comprising a first soft plastic non-frangible major portion having a water activity of 0.5 or less and about 1% to 15% % of a second food portion of small direct expanded puffed particulates fabricated from a cooked cereal dough. The puffed pieces are formed by direct puffing or expansion into individual pieces rather than by grinding or size reducing larger cereal pieces. The puffed cereal particulates thus have a continuous unbroken skin or surface surrounding the particulates as a result of the direct expansion formation. The particulates have a size ranging from about 0.5 to 2 mm, a moisture content of less than 6%, and, a bulk density ranging from about 0.15 to 0.25 g/cc. The cooked cereal dough from which the particulates are fabricated comprises at least 45% rice flour. The products exhibit a crispy texture notwithstanding the softer texture of the major phase.

19 Claims, No Drawings

FOOD PRODUCT AND METHOD OF PREPARATION

CROSS-REFERENCE TO RELATED APPLICATIONS

The present application represents a divisional application of U.S. patent application Ser. No. 10/209,707, filed Aug. 1, 2002 now U.S. Pat. No. 7,264,835.

BACKGROUND OF THE INVENTION

The present invention relates to food products and with their methods of preparation. More particularly, the present invention relates to intermediate moisture food products such as dehydrated fruit products comprising a second crispy component and to their methods of preparation.

Wholesome snacks prepared from sweetened, intermediate moisture, shelf stable fruit or "fruit snacks" herein have long been popular food items. (See, for example, U.S. Pat. No. 2,272,990, issued Oct. 18, 1941 to Forkner et al. and U.S. Pat. No. 2,650,880, issued Oct. 1, 1941 to A. M. Ericson).

Such wholesome fruit snack products are sold in various physical forms and shapes such as: 1) in rolled sheet form; 2) in rolled strip or ribbon form; 3) in string form mounted on a U-board; 4) soft center filled pieces, and 5) in gelled bite size pieces of various shapes or in gelled bite size pieces form prepared by starch molding. Generally, these products are prepared from wet mixtures of the various fruit materials and added ingredients that are dried to desired moisture contents. The dehydrated compositions are then formed into articles of desired shapes and sizes. In other variations, all or a portion of the fruit material is substituted with pure sugars. Such low fruit, high sugar formulations can be flavored with fruit flavors and/or other flavors. Within this general similarity, however, the particular methods of preparation, product formulations and apparatus used to prepare particular products vary considerably. Moreover, such variations are highly interdependent. Formulations and method steps suitable for one product form might or might not be suitable for another product form due to the processing difficulties, or desired end product attributes such as shape or texture.

Particularly popular products are in rolled sheet form such as are sold under the Fruit Roll-Ups brand. Popular products rolled strip form are sold under the Fruit By The Foot brand (see also, U.S. Pat. No. 5,455,053 entitled "Rolled Food Item" issued Oct. 3, 1995). Food products in string form mounted on a U-board are sold under the String Thing™ mark while other products in bite size pieces of various shapes are sold under various brands. (See, for example, commonly assigned U.S. Pat. No. 5,942,268 entitled "Embossed Shape Food Item" issued Aug. 24, 1999 to Zimmermann et al.). Soft center filled pieces products are described in U.S. Pat. No. 4,853,236 entitled "Dual Textured Food Piece Of Enhanced Stability Using An Oil In Water Emulsion" (issued Mar. 18, 1988 to Langler et al.) while apparatus and fabrication methods therefor are described in U.S. Pat. No. 5,208,059 entitled "Dual Textured Food Piece Fabrication Apparatus" (issued Jun. 10, 1992 to Dubowik et al.).

These dried fruit products are especially popular with children, particularly as snack or convenience foods. To continue to appeal to children, manufacturers must introduce frequent changes to such products. For example, the shapes of the products can be changed to employ currently popular character shapes such as from a movie, television show, cartoons, etc.

The present invention provides further improvements to such intermediate moisture products whereby a composite food product having a pleasing dual texture is provided by admixing the intermediate fruit with selected small crisp and crunchy direct expanded puffed cereal pieces that maintain their crisp texture properties over extended times. By selecting a continuous phase with a low water activity, the particulate cereal based particulates, maintain their desired crisp texture.

BRIEF SUMMARY OF THE INVENTION

In its product aspect, the present invention is directed towards composite food products comprising a first major portion having a water activity of 0.5 or less and about 1% to 15% of a second food portion of direct expanded puffed particulates fabricated from a cooked cereal dough intermixed through the first portion. The puffed pieces are formed by direct puffing or expansion into individual pieces rather than by grinding or size reducing larger cereal pieces. The puffed cereal particulates preferably have an unbroken shell as a result of the direct expansion formation. The particulates have a size ranging from about 0.5 to 2 mm, a moisture content of less than 6%, and, a bulk density ranging from about 0.15 to 0.25 g/cc. The cooked cereal dough from which the particulates are fabricated comprises at least 45% rice flour.

In its method aspect, the present invention resides in methods of preparing composite food products such as a dried sweetened fruit with particulates fabricated from cooked cereal doughs. The process involves the post fruit dehydration addition of the particulates especially at elevated temperatures.

The process includes the steps of:
A. providing a first major food portion having an $A_w$ of less than 0.52; and
B. admixing a second minor food portion of puffed unground particulates fabricated from a cooked cereal dough,
wherein the particulates have a size ranging from about 0.5 to 2 mm,
wherein the particulates have a moisture content of less than 30%,
wherein the cooked cereal dough comprises at least 45% rice flour,
wherein the particulates have a bulk density ranging from about 0.15 to 0.25 g/cc to form a composite food product.

DETAILED DESCRIPTION OF THE INVENTION

The present invention provides food products comprising a first major food portion having a water activity of 0.52 or less and a second food component comprising puffed sized particulates of cooked cereal dough fabricated from high rice flour containing doughs. Each of these food product components as well as methods for the preparation of the present food products is described in detail below.

Throughout the specification and claims, percentages are by weight and temperatures in degrees Centigrade unless otherwise indicated.

A principal or major component of the present invention is a food component or portion having a water activity of 0.52 or less and that is preferably plastic or semi-solid, and more preferably thermoplastic. The present invention finds particular suitability for use in connection with intermediate moisture dehydrated fruit compositions or products. However, while the present invention is described with particular reference to such intermediate moisture fruit products, the present invention also finds usefulness in the provision of other low water activity plastic materials such as chocolate (whether dark or milk chocolate), peanut butter (and other nut butters, e.g., pecan or almond butter and mixtures thereof), and confectionary fats especially sweetened confectionary fats with fat profiles mimicking cocoa butter. In certain variations, the major component can comprise region or portions, e.g., layers, fabricated from one or more suitable compositions. Thus, a parfait type product comprising unmixed, e.g., alternating layers of peanut butter and jam or jelly can be used as the major portion.

In still another variation, the major food component is a dry powder blend such as a flour based dry baking mix such as for layer cakes, muffins, pancakes, biscuits, dessert bars, etc.

Broadly, the first food portion must be mixable with the puffed particulates under at some temperature or condition. For example, for those first portion compositions that become liquid or at least fluid or plastic at elevated temperatures, e.g., a fruit paste or slurry, chocolate, or peanut butter can be used. The first portion can be heated to melting or thinning, the cereal particulates added while the first phase is molten and the so formed mixture can be allowed to cool to form the present composite products. In other variations, the first portion can be a liquid or plastic mass before addition of a thickening agent or gel setting agent. For example, a gelable fruit sauce having a calcium settable gelling agent such as pectins can be used. The particulates can be added before or shortly after the calcium gel setting agent is added to set the gel. In another variation, the gelling agent can be an acid setting type and the particulates can be added before or shortly after a gel setting acid (e.g. a solution of an edible organic acid) is added to set the gel. Dry powders such as dry baking mixes can also be used since these compositions are easily mixed with the puffed particulates. The dry mixes can contain larger particulates such as dried fruit pieces and/or nut pieces.

The major food phase is essentially characterized by a low water activity ($A_w$) of 0.52 or less ("$0.52 \geq A_w$"). Such low water activity values are important to maintaining the crisp attribute of the second puffed cereal pieces herein as well as shelf stability at room temperatures for extended times. Also, selection of such lower water activity first food portions is important to minimizing moisture migration that can result in undesirable reductions in the crisp texture of the small cereal particles. Food compositions such as pudding having a higher water activity of about 0.85 thus would not be suitable for use herein. Preferred for use herein are plastic food phases characterized by $A_w$ ranging from about 0.3 to 0.5 ($0.3 \leq A_w \leq 0.5$) and for best results ranging from about 0.4 to about 0.5. For higher water activity materials, the excess water should be removed prior to addition of the cereal particles or pellets.

Broadly, the first food phase is the largest portion of the food product. In more preferred embodiments the first food phase comprises about 65% to about 99% of the composite food product and for best results about 85% to 98%.

In the preferred embodiment, the first major food portion is supplied by an intermediate moisture fruit preparation or sauce having a water activity as described above. The fruit preparation or sauce generally comprises fruit materials that provide fruit solids and moisture, added pure sugars and optionally, a humectant.

The fruit solids can be derived from fruit purees prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and unheat-treated whole fruit pieces which have been mechanically transformed into fluids. Thus, the present comminuted fruit material can be distinguished from discrete individual pieces of intact fruit flesh. However, the fruit preparation does not require that all fruit material therein be macerated and the fruit sauce can include discreet fruit chunks pieces or bit as convenient.

Both unseeded and, deseeded purees can be used. Fruit puree generally contains about 55 to 90% moisture. The fruit solids component can also be supplied by other edible fruit portions, such as fruit pulp. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include apricot, pineapple, lemon, orange, peach, pear, lime, banana, grape, mango, apple, tomato, blackberry, plum, watermelon, blueberry, raspberry, strawberry, current, cherry, cranberry, and mixtures thereof. Preferred fruits are selected from the group consisting of apples, strawberries, cherries, blueberries, raspberries, grapes, oranges and mixtures thereof. Most highly preferred for use herein are apples, blueberries, grapes, strawberries, and mixtures thereof and cherries.

Fresh fruit is, of course, useful for preparing the products herein. However, previously frozen fruit, canned fruit, partially dehydrated fruit or rehydrated fruit, as well as frozen juices, concentrates, nectars, or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden variety vegetables such as carrots, celery, tomato, peas, beets. The sugars, flavors, acids, pectinaceous or cellulosic fibers and ash of which plant solids are typically comprised are intended to be included within the term edible plant solids. However, "edible plant solids" is not intended to include such starch fractions as derived from cereal or grass grains such as wheat or other cereal flours nor oleaginous materials such soybean oil. That is, the present fruit solids can be wholly or partially replaced with equivalent amounts of ordinary garden vegetable solids. However, vegetable flavored products are not nearly as popular as those which are fruit flavored. However, certain vegetables, e.g., pumpkin, squash and carrot enjoy some popularity as novelty items.

Also useful herein are fruit juice solids especially from inexpensive fruit sources such as grape juice, apple juice, pear juice. If present, such juice solids can constitute about 0.1 to about 70% of the finished fruit snack products herein.

The present compositions essentially comprise from about 5 to 65% (dry weight basis) of the composition of comminuted fruit or plant solids. Better results in terms of natural flavor and color but at economical costs are obtained when the fruit solids are present at from about 10 to 25%. Best results are obtained when the fruit solids are present at about 18%.

The present dried fruit compositions can additionally and preferably do essentially comprise an added or supplemental carbohydrate ingredient. In preferred embodiments, at least a portion of added carbohydrate ingredient is a nutritive carbohydrate sweetening agent (or, equivalently "sweeteners").

The added or supplemental carbohydrate component herein is present at from about 0.1 to 85%. Better results in terms of flavor and low stickiness are obtained when the sweeteners comprise about 20 to 70% of the composition. For best results, the supplemental carbohydrate content should range from about 30 to 45%.

The term "nutritive carbohydrate sweetening agent" is used herein to mean those typical purified sweetening agents conventionally used in food products. Of course, the present nutritive carbohydrate sweetening agents are to be distinguished from non nutritive carbohydrate sweetening agents such as saccharine, cyclamate, and the like. Additionally, the present nutritive carbohydrate sweetening agents are to be distinguished from such protein-based sweetening agents as aspartame, thaumatin, and monellin. The added pure sweeteners are also, of course, to be distinguished from the native sugars that are provided by the fruit ingredient.

Suitable materials for use as nutritive carbohydrate sweetening agents are well known in the art. Examples of sweetening agents include both mono-saccharide and di-saccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, and fructose. Of course, mixtures of the above-noted materials are contemplated herein.

In one embodiment, the carbohydrate ingredient is supplied at least in part by a bodying agent. The bodying agent can serve to add both bulk and body and, most importantly, provide additional solids so as to enable the realization of fruit compositions having moisture contents within the essential ranges given herein. Especially useful herein as bodying agents are maltodextrins. Generally, the maltodextrin component is present at from about 0.1% by weight to about 50% by weight. Malto dextrins are also desirable since they provide solids without forming a gel which can affect the texture of the fruit sauce. Superior results in terms of sweetness balancing and prevention of crystallization are obtained when the maltodextrin component is present in the compositions at from about 3 to 45% by weight. For best results, however, the maltodextrin component should be employed at from about 10 to 40% of the dried fruit composition.

The bland maltodextrin provides minimal sweetness. Thus, low D.E. (dextrose equivalent) maltodextrin should be employed. By low D.E. is meant a maltodextrin with a D.E. of less than about 20. Low D.E. maltodextrins are commercially available and the skilled artisan will have no difficulty in selecting suitable maltodextrins for use herein. Generally, however, maltodextrins can be obtained by dextrinization of starch, particularly corn starch. Enzymatic hydrolyzates, optionally under acidic conditions, of the starch can be used; the conditions are so mild that negligible repolymerization occurs. This is in contrast to dextrins which typically are made from starch by hydrolyzates and repolymerization by using high temperature and pressure by dry heating or roasting of the starches (pyrodextrins). Such materials are well known (see, for example, U.S. Pat. No. 3,586,513, issued Jun. 22, 1972 to H. E. Horn et al. and U.S. Pat. No. 4,335,155, issued Jun. 15, 1982 to Blake et al.), and are widely available in the food industry.

Another class of materials useful herein as bodying or bulking agents are hydrogenated starch hydrolyzates which are commonly referred to as "polydextrose." Polydextrose provides an added advantage of being a low calorie material, i.e., having about one calorie per gram as opposed to about four calories per gram for most carbohydrates.

In addition to the pectin content from the fruit material, the fruit component can additionally comprise a gelling agent such as guar gum, locust bean gum, xanthan gum, carageenan, gelatin and various mixtures. Preferred for use herein are thermo setting gums rather than calcium setting gums since compositions comprising such gums form thermoplastic reversible gel compositions that can be fluidized by heating to above gel forming temperatures to facilitate admixture with the puffed particulates. Preferred thermosetting gums herein include gelatin, pectin, guar gums and mixtures thereof. If present, such added gums can comprise about 0.1% to about 2% of the fruit component. In less preferred embodiments, the compositions can comprise an acid setting gelling agent or a calcium setting gelling agent, e.g., added pure pectin. Of course mixtures of various gelling agents are also contemplated herein.

In certain embodiments, the present fruit major portion sauce or gel can comprise a humectant. Good results are obtained when the humectant is present in the fruit sauce ranging from about 0.5% to about 15%, preferably about 3% to 8% humectant. Useful humectants include are selected from the group consisting of sorbitol, xylitol, manitol, glycerin, glycerol, proplylene glycol and mixtures thereof. Preferred for use herein is sorbitol and glycerin especially glycerin.

The present food compositions can optionally contain a variety of additional ingredients suitable for rendering such products more organoleptically acceptable, more nutritious and/or more storage stable. While not essential to the present food compositions, such optional components include fiber materials, high potency sweeteners, colors, coloring agents, vitamins, minerals, preservatives, emulsifiers, shortening, dairy products, acidulants, and nutriceuticals, the like. Of course, highly preferred for use herein are "natural" ingredient additives.

Certain fruit component embodiments can additionally comprise low levels of a fat component. The fat component additionally affects the eating qualities of the present compositions. Inclusion of a fat increases the shortness of the texture as well as reduces modestly the stickiness of fruit based composition to the consumer's teeth. If present, the shortening can comprise 2% or less of the fruit composition, preferably 0.1% to 0.5% of the composition. Useful herein are shortenings and oils that are conventional for use in food products, especially for confections. Both conventional fatty triglyceridic materials such as oils and fats can be used herein. Preferred for use herein are fats, especially partially hydrogenated oils such as soybean, coconut, cottonseed or fractionated oils, all of which have melting points above room temperature. Employment of such particular fats are preferred due to a reduced tendency of the glyceridic component to grease out of the present fruit compositions. It will, of course, be appreciated that when the major food portion is provided by a non-fruit bare, e.g., peanut butter, the fat content can be much higher.

Optionally, a variety of edible organic acids can be used to adjust the pH of the present invention as well as to control the taste and tartness of the present products or to set any acid setting gelling agents, if present. Especially suitable for use herein are citric acid, tartaric acid, malic acid, succinic acid, and mixtures thereof. Preferred for use herein is citric acid. In preferred embodiments, the dried fruit composition has a pH of about 3 to 6, preferably about 3.2 to 3.6.

In certain embodiments, the dried fruit material is quite bland and/or lacks a strong color, e.g., when the fruit source is supplied by white grape juice solids and/or pear puree. If desired, supplemental colors and flavors can be admixed into the fruit preparation, preferably after heating such as to concentrate to avoid extended exposure of the sensitive flavor materials to elevated temperatures, for color and flavor manipulation of the fruit composition.

The fruit component can be prepared by blending together the various dry and wet ingredients to form a wet blend and drying the wet blend to desired moisture content to obtain compositions of the requisite water activity. The water activity of the finished fruit component is influenced by the finished moisture content. Good results in terms of the water activity being within the desired range and fluidity of the fruit component at desirable temperatures is obtained when the moisture content of the finished fruit component ranges from about 9 to 20%, preferably about 12 to 16%.

To facilitate the blending of the fruit component with the second puffed cereal particulate second component, the fruit components can be mildly warmed or heated to temperatures below flavor degradation temperatures to form a heated thin or fluid fruit component such as temperatures ranging from about 40° C. to 60° C., preferably about 45° C. to 55° C. Preferred fruit components compositions are additionally characterized by a thin viscosity at such temperatures ranging from about 15,000 to 25,000 cps. At room temperature, the fruit composition can have a much higher viscosity such as ranging from about 150,000 to 300,000 cps (20° C.) and can be physically characterized as a plastic semisolid or paste.

In the preferred form, the fruit component has the following composition:

| | |
|---|---|
| Fruit solids | 2% to 50% |
| Added Sugar(s): | 8% to 70% |
| Glycerin (humectant) | 0.5% to 20% |
| Moisture | 5% to 25% |
| Fat | ≦2% |
| pH | 3 to 6 |
| Viscosity at 55° C. | 10,000 to 30,000 cps. |

Generally, the fruit component is un-aerated and has a density ranging from about 1.1 to 1.4 g/cc depending upon the particular formulation. In certain embodiments, however, the fruit component can be modestly aerated to densities of about 70% to 99% of their un-aerated densities. In still other variations, however, e.g., dried marshmallow confections, the major portion can be highly aerated and by characterized by densities of 0.1 to 0.3 g/cc.

The present food products additionally essentially comprise a second lesser or minor food portion of direct expanded sized puffed particulates fabricated from a rice based cooked cereal dough. The particular level of particulates depends in part upon such factors of level of particulates desired, as well as the size and shape of the particulates. Good results are obtained when the particulates range from about 1% to 20%, preferably about 8% to 13% of the food product.

The puffed particulates are importantly characterized by a size ranging from about 0.5 mm to 6 mm in diameter or, for non spherically shaped particulates in largest dimension. More preferred are spherical or oval shaped or generally spherical particulates having an aspect ratio of less than 2:1. Selection of such sized particulates is important to obtaining the desired crispy textural features desired herein. Smaller sized particles lack sufficient bite while larger sized particles make the composite fruit product both difficult to work into desired finished shapes as well as form homogeneous blends of particulates and fruit in some pieces. Preferred for use herein are particulates having a size of 0.5 to 3 mm and for best results about 2 mm. Particulate sizes within the range is also helpful in aiding mixing within the major portion. The puffed particulates can be all of about one size (homogeously sized) or can comprise blends or distributions of various shaped and sized particles.

While rounded and preferably spherically shaped particulates are preferred for use herein, the particulates can be of random and irregular shape or can be of particular shapes, e.g., in the form of cylinders, shreds, ovals, cones, crescents, stars, and mixtures thereof.

The particulates are desirably fabricated by direct expansion of a puffed cereal dough so as to form a continuous outer surface or unbroken skin. Direct expansion such as from a single or twin screw extruder is well known in the food or cereal art and the skilled artisan will have no difficulty in selecting useful equipment and operating conditions in forming such direct expanded formed cereal puffed particulates. Generally, however, cooked cereal dough is heated under pressure to temperatures of 110 to 150° C. and then extruded to atmospheric pressure whereby moisture in the cooked cereal dough flashes to vapor causing a rapid expansion and puffing of the cooked cereal dough. Such a continuous outer surface or skin surface feature has been found to be important to maintaining the desired crisp texture over time. The presence of such a continuous preferably imperforate skin or surface feature on each individual piece distinguishes the present particulates from particles fabricated by mere size reducing larger cereal pieces that results in particles although of similar size are characterized by open or broken cells structures at their outer surfaces than allow for moisture migration that over time can result in loss of texture. Thus, the present particles can be characterized as being "unground" compared to such ground particles prepared by size reduction whether purposefully prepared or incidentally formed, e.g., ready-to-eat cereal fines. It has been surprisingly found that such direct expanded small sized unground particles are unexpectedly superior in providing and maintaining over time the desired crisp texture.

The puffed cereal particulates are prepared from a rice based cooked cereal dough comprising at least 45% rice flour in addition to a second or additional cereal dough ingredients. The balance of the second or additional cereal ingredients can be supplied by such other flours or cereal ingredients derived from other major cereal grains such as wheat, corn (maize), barley, oats, rye and mixtures thereof. Surprisingly, the cooked cereal dough can also comprise soy flour. Selection of such a rice based cooked cereal dough is also important to texture and crispness over time. Preferred cooked cereal dough particulates comprise about 45% to 90% rice flour, preferably about 55% to 70% rice flour. Of course, minor cereal grain ingredients can also be used such as amaranth, triticale, millet, sorgum, potato flour, wild rice, and mixtures thereof.

The present puffed rice based generally rounded pieces with unbroken surfaces are thus importantly to be distinguished from oat flakes or wheat flakes that are not useful substitutes herein to provide the desired crunchy texture attribute.

In addition to the cereal or soy flour ingredients, the cooked cereal dough can comprise conventional cooked cereal dough ingredients such as 1% to 4% salt, and 1% to 15% sugar(s). If desired, the cooked the cooked cereal dough can be formulated with additional optional ingredients to improve the flavor, appearance or nutritional value of the puffed particulates, including, for example, flavors, colorants, vitamins, and minerals, e.g., calcium. Care must be exercised in adding calcium to prevent discoloration. (see for example U.S. Pat. No. 6,210, 720 Calcium Fortified Food Product and Method of Preparation which is incorporated herein by reference).

In one preferred variation, the puffed cereal particulates include a colorant to provide the pieces with the same color as the color of the major food phase. For example, for a strawberry based filling, the puffed cereal particulates can comprise a red colorant in amounts sufficient to match the color and hue of the fruit component to mask the appearance of the particles. If desired, the particulates can also have a complementary flavor that can be the same or different than the fruit or major food portion component. For example, the cereal particulates can be provided with both a red colorant and a strawberry flavor. In contrast, if the major food phase is chocolate, the puffed cereal pieces can be provided with a brown color and complementary flavor such as a peanut butter flavor. In other variations, all or a portion of the puffed cereal particulates can be provided with a color intended to standout against the background color of the major food phase whether in color or hue.

The puffed cereal particulates can also include or one more ingredients to provide desired special nutritional properties. For example, the particulates can include about 1% to 20% ingredients to provide soluble or insoluble fiber. For example, the cereal can include about 1% to 20% inulin as a source of soluble fiber. Other ingredients can include conventional levels of vitamins. In another variation, the puffed pieces can contain insoluble calcium materials, e.g., calcium carbonate or calcium phosphate salts, that are difficult to add to the fruit phase such as due to interaction between the calcium material and the fruit material. In still another variation, the puffed pieces can comprise a whole grain cereal ingredient to provide whole grain nutritional properties to the food compositions. Additional of the whole grain cereal ingredient to the fruit The puffed pieces can be fabricated using known puffed cereal puffing apparatus and techniques. Conveniently, the dry cereal ingredients are admixed with water and cooked and blended in a cooker extruder such as a single screw or twin screw cooker extruder to form a cooked cereal dough having a moisture content ranging from about 8% to 15%. The cooked cereal dough so prepared is extruded under conditions of pressure and temperature to directly expand upon extrusion to form the present puffed cooked cereal dough particles. In particular, the pieces can be extruded through a multiplicity of round dieports whereby spherically shaped particles are obtained. The expanded particles are characterized by bulk densities ranging from about 0.15 to 0.25 g/cc, preferably about 0.16 to 0.22 g/cc and for best results about 0.22 g/cc, e.g., about 55 g of particles in a 250 ml volume. The direct expansion puffing also results in a reduced moisture content resulting from the expansion or puffing step. Importantly, the puffed particulates are initially characterized by a moisture content of less than 6% preferably less than 3%, i.e., prior to admixture with the fruit component. Due to the extremely small size, at present fabrication of the cooked cereal dough into small pellets and thereafter puffing such as with gun puffing to form individual pieces is not commercially practical. Also, the particulates are generally characterized by a low fat content in the cooked cereal dough (less than 5%) and thus preferably are not prepared by deep fat frying.

The puffed cooked cereal dough ingredients can be prepared by known equipment and techniques. Also, suitable particulates are commercially available from Kerry Sweet Ingredients (Freemont Nebr. USA) under the trade name Rice Crisp Tiny Tots.

Optionally, the food products can additionally comprise one or more ingredients having compatible water activity values especially those in particulate form such as nut pieces (e.g., peanuts or seeds, e.g., sesame seeds, infused or dried fruits pieces or bits, e.g., raisin, or texturized vegetable protein. Good results are obtained when such supplemental ingredients comprise about 1% to 25%, preferably 5% to 10% of the food product. In preferred variations, the particulates are characterized by a particle size (smallest dimension) of about 1 to 4 mm. For example, a chunky style peanut butter having small bits or particles of peanuts intermixed with peanut butter makes an excellent major food portion. In still other variations, the food products can optionally contain an added mineral ingredient in powder form such as calcium phosphate and/or calcium carbonate in amounts of 0.1% to 2% by weight added calcium especially for those products intended for those consumer populations particularly in need of calcium such as children and women.

In its method aspect, the present invention provides food product preparation methods comprising a first step of providing a first low $A_w$ food portion and admixing a second minor food portion of puffed to form a composite food product. Conveniently, the first food portion can be heated to form a mixable or fluid phase to facilitate blending of the second puffed particulate. However, when the first is in the form of a dry powder blend such as for a dry mix for baked goods, heating is not required to form the composite e product.

The major food phase generally is the continuous phase in which the particulates are dispersed as a discontinuous phase or food portion. However, in certain variations, the fruit sauce or phase is a binder or core portion with the particulates generally disposed about the fruit potion or phase.

Thereafter, the puffed particulate bearing sweetened fruit composition can be fabricated, and the present methods further comprise a step of forming, conveniently while the fruit paste portion is still warm and formable, into suitably sized and shaped individual pieces to form the present composite fruit snack products herein.

In view of the stickiness of the products, such piece forming step can involve the substep of mounting the fruit onto an inedible film or substrate. The substrate typically includes an antistick coating and/or is fabricated from materials that facilitate removal of the dried fruit product therefrom for consumption. Typical shapes include thin films (whether parallelograms or rolls), bars, strings or ropes, and/or bite-sized nuggets. The nuggets can be in irregular form or be shaped to desired configuration, e.g., figurines such as animals, vehicles, toys. In still other variations, the composition can be fabricated into various shapes and sizes such as wafers or disks reminiscent of cookies.

A particularly desirable form is a roll product. The fruit composition is formed into an extended strip of about 10 to 30 mm in width and from 50 to 150 cm in length, about 1 to 8 mm in thickness, preferably 3 to 5 mm, mounted upon a slightly larger film substrate (e.g., having a margin of 1 to 2 mm). The product can be wound to form a roll having 5 to 15 turns. The roll can be secured in a wound configuration with a peripheral label or by other means.

The individually shaped pieces can then be cooled to approximately room temperature and subsequently packaged in conventional manner. Conveniently, the cooling step can be practiced in a cooling tunnel or other conventional means.

The finished products are soft, pliable, tearable products of both good flavor and eating quality. The finished products have a water activity ranging from about 0.3 to 0.52 and a moisture content of 9 to 20%, preferably about 12 to 16%.

In another variation, the composite food product can be fabricated into a bar shaped product such as having a length ranging from 5 to 15 cm, a width ranging from about 1-5 cm, and a thickness ranging from about 0.25 to 2 cm. or in sheet form having a length or width ranging from 150 cm to 250 cm and a thickness of less than 2 mm.

In another variation, the composite food product can be fabricated into a individual pieces ranging in size from about 1 to 10 g each of random or patterned shapes.

In another variation, the composite food product can be fabricated into a filling layer such as in a layered cereal, cake, or cookie bar or as a filling in a coated confection, e.g., a chocolate coating or in a candy bar.

The resultant products of the present invention are characterized by a novel and pleasing eating quality of a crispy fruit product suitable for consumption as a fruit based snack or treat. In view of their novelty appearance and texture, the present products find particular suitability for use as or in the fabrication of child oriented fruit snacks. For example, the compositions can be fabricated into rolled sheets or into rolled ribbons (as described generally in U.S. Pat. No. 5,455,053 "Rolled Foods Items issued Oct. 3, 1995 and which is incorporated herein by reference). In preferred form, products fabricated from the present compositions are packaged in moisture transfer resistant packaging such as plastic film so as to reduce moisture loss from the fruit compositions over storage. In other variations, the package can include a vacuum seal.

In still another variation, the food products can be fabricated into bite size pieces that can be added to or blended with Ready-To-Eat cereal products such as corn, oat, rice or wheat flakes, puffs, shred or biscuits such as to comprise about 1% to 30% of such RTE cereal products.

In still other variations, the food products can be added to granola bars such as in the form of a layer intermediate upper and lower grain based layers. In still other variations, the grain based layers can be supplied by puffed and/or flaked cereals held together with a sugar or gelatin based binder (see for example U.S. Ser. No. 09/667,209 "Layered Cereal Bars and Their Method and Apparatus of Manufacture" of filed Sep. 21, 2000 which is incorporated herein by reference). The present fruit layer can be used in addition or substitution for the intermediate creme filling layers disclosed therein. In still other variations, the present compositions can form a core portion of a composite product surrounded by one or more shell or coating layers such as fabricated from granola or other cooked cereal grain based compositions.

In still another variation, the fruit based composite food products are contained in sealed plastic cups and are spoonable to provide novel fruit based crispy textured spoonable products analogous to gelatins or applesauce or yogurt but that are shelf stable without refrigeration.

While the present food products find particular suitability for use in providing products that are shelf stable, i.e., do not require refrigerated or frozen distribution, the present products can be used as portions of products intended for frozen or even refrigerated distribution. For example, in the provision of frozen ice cream novelty products, the present food products can be used to provide one or more layers or portions providing appealing crunchy taste characteristics. However, since such frozen or refrigerated products are often higher in water activity, care must be taken to protect against excessive moisture migration that would over time result in loss of texture in the cereal particles used herein. For example, the particulates can be fabricated to include a thin (e.g. less than 0.5 mm in thickness) surrounding fat layer. Also, care can be exercised during product and distribution to minimize exposure to freeze thaw cycles.

In still another variation, the first food portion is a dry baking mix such as a dry mix for layer cakes, muffins, desserts, or quickbreads. In this variation, the admixing step can be practiced at room temperatures to form a composite food product in the form of a baking mix comprising the present pellets. The resultant composite food product can be admixed with water or milk to form a batter and the baked to form a baked good. Surprisingly, if the batter holding time is sufficiently short such as is characteristic of normal at-home or commercial bakery practices, the pellets maintain their crispness in the finished baked good for immediate consumption after baking.

In still another variation, the particulates can be added to a smooth or crunchy style peanut butter to provide a composite food product reminiscent of crunchy style peanut butter (i.e., having peanut particles mixed with smooth peanut butter) that provides the texture of crunchy style peanut butter but is lower in fat due to the dilution effect of the cereal dough based particulates. Preferred for use herein is peanut butter that has been partially hydrogenated for shelf stability.

In still other variations, the compositions can have regions of high concentration of particulates such as a region or layer simulating crunchy peanut butter while other layers or portions have lower levels particulates or even portions that are particulate free. That is, the particles can be homogeneously or heterogeneously intermixed throughout the major food phase.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for preparing a composite food product, comprising the steps of:
   providing a first major food portion having a water activity of less than 0.52: and,
   admixing with the first major food portion a second minor food portion of puffed unground particulates which are fabricated from a cooked cereal dough and have a continuous outer surface which defines an unbroken skin,
   wherein the particulates have a size ranging from about 0.5 to 2 mm,
   wherein the particulates have a moisture content of less than 6%,
   wherein the cooked cereal dough comprises at least 45% rice flour,
   wherein the particulates have a bulk density ranging from about 0.15 to 0.25 g/cc, to form a composite food product.

2. The method of claim 1 wherein the first major food portion has a water activity ranging from about 0.3 to about 0.5.

3. The method of claim 2 wherein the first food portion is a thermoplastic mass and wherein the admixing step is practiced to uniformly distribute the particulates throughout the first major food portion.

4. The method of claim 3 wherein the second food portion comprises about 1% to about 15% of the composite food product.

5. The method of claim 4 additionally comprising an intermediate step of:
   heating the first major food portion to a temperature of about 40° C. to about 55° C. to form a heated fluid food portion having a viscosity ranging from about 15,000 cps to 25,000 cps.

6. The method of claim 5 wherein the first major food portion comprises a fruit preparation comprising fruit solids, sugar, a humectant and moisture and having a fat content of less than 2%.

7. The method of claim 6 additionally comprising the step of:

forming the composite food product into shaped and sized pieces.

8. The method of claim 7 wherein the admixing step forms a heated formable composite food mass.

9. The method of claim 8 wherein the heated formable composite food product has a temperature ranging from about 30° C. to about 55° C.

10. The method of claim 9, further comprising forming the composite food mass into a sheet.

11. The method of claim 9 wherein the forming step is practiced to form pieces each weighing about 1 to 10 g.

12. The method of claim 4 wherein the composite food product additionally comprises about 1% to 20% particulates having a water activity of 0.50 or less.

13. The method of claim 12 wherein the particulates comprise a member selected from the group consisting of nut pieces, seeds, textured vegetable protein, dried fruit, and mixtures thereof.

14. The method of claim 4 wherein the first food portion and the particulates are of the same color.

15. The method of claim 14 wherein the first food portion and the particulates are of the same color and hue.

16. The method of claim of 1 wherein the admixing step is practiced to provide at least a portion of the particulates in the form of a surface coating to the first food portion.

17. The method of claim 12 wherein the particulates have a particle size of 0.1 to about 3 mm.

18. The method of claim 1 wherein the first food portion comprises a dry baking mix.

19. The method of claim 1 wherein the particulates have a crunchy texture attribute and remain crisp over an extended period of time verses puffed particulates which do not exhibit a corresponding continuous outer surface with an unbroken skin.

* * * * *